United States Patent [19]
May

[11] Patent Number: 5,984,179
[45] Date of Patent: Nov. 16, 1999

[54] CARD READER/WRITER WITH PIVOTING READ/WRITE CONTACT HEAD

[75] Inventor: David C. C. May, Fife, United Kingdom

[73] Assignee: NCR Corporation, Dayton, Ohio

[21] Appl. No.: 08/883,476

[22] Filed: Jun. 25, 1997

[30] Foreign Application Priority Data

Oct. 15, 1996 [GB] United Kingdom .................... 9621438

[51] Int. Cl.⁶ .................................................. G06F 17/60
[52] U.S. Cl. .......................... 235/379; 235/380; 235/441; 235/475; 235/492
[58] Field of Search .................................... 235/379, 380, 235/441, 475, 479, 480, 483, 486, 492, 495; 902/17, 26; 361/740, 747, 759

[56] References Cited

U.S. PATENT DOCUMENTS

| | | | |
|---|---|---|---|
| 4,449,775 | 5/1984 | De Pommery et al. | 439/260 |
| 4,724,310 | 2/1988 | Shimamura et al. | 235/483 |
| 4,940,418 | 7/1990 | Shimizu et al. | 439/260 |
| 5,045,674 | 9/1991 | Mita et al. | 235/439 |
| 5,091,618 | 2/1992 | Takahashi | 235/441 |
| 5,332,889 | 7/1994 | Lundstrom et al. | 235/380 |
| 5,780,827 | 7/1998 | Zolkos et al. | 235/441 |

FOREIGN PATENT DOCUMENTS

| | | | |
|---|---|---|---|
| 2-23494 | 1/1990 | Japan | 235/486 |

*Primary Examiner*—Donald Hajec
*Assistant Examiner*—Jared J. Fureman
*Attorney, Agent, or Firm*—Michael Chan

[57] ABSTRACT

A card alignment mechanism for an integrated circuit contact (ICC) card (30) has first and second arms (12,14) biased towards each other about the same pivot point (16) by a spring (24). One arm (12) carries a card read head (18), the other arm (14) carries a card stop lip (20). A solenoid (28) rotates the arms about the pivot point (16); the card stop lip (20) on the second arm (14) contacts the card (30), and the first arm (12) continues to rotate until the spring (24) is fully compressed, when the card read head (18) is correctly positioned with respect to the card. When the mechanism is incorporated in an automated teller machine (ATM), the arms (12,14) can be retracted to their rest position, and the card (30) moved past the mechanism to a card capture bin (45) without restriction.

12 Claims, 3 Drawing Sheets

CARD READER/WRITER WITH PIVOTING READ/WRITE CONTACT HEAD

BACKGROUND OF THE INVENTION

This invention relates to a reader/writer for an ICC (Integrated Circuit Contact) card having data, such as a card for an Automated Teller Machine (ATM), or a smartcard or electronic purse.

When such a card is initially written and subsequently read, it is essential to have the card positioned accurately with respect to the reader/writer. At present, this is achieved by inserting the blank or written card into a slot until its leading edge touches a stop; the reader/writer contacts can then be lowered onto the ICC area of the card at exactly the required positioned.

When a card is issued to a user, it may then be stolen, or used fraudulently, in which case a financial institution operating a card-reading system, such as an ATM system, or a SmartCard terminal, may wish to capture the card the next time it is used.

It is highly preferable if such a capture can be achieved automatically, with the card retained in e.g. the ATM. With the present construction of card readers in ATMs, the stop for the leading edge of the card is provided by a rear wall of the insertion slot, therefore retention of a card requires physical removal of the rear wall, which can only be achieved by a complex combination of mechanical, electrical, and software controls within the ATM.

SUMMARY OF THE INVENTION

It is the object of the invention to provide a reader/writer for an ICC card which has a simplified alignment arrangement, and which permits easy automatic capture of a card.

According to a first aspect of the invention there is provided an ICC card reader/writer comprising means to receive a card; and ICC read/write means; characterized by card alignment means comprising a first moveable support carrying said ICC read/write means; a second moveable support carrying card stop means; resilient means to bias the first and second supports relative to each other in a first direction; and drive means arranged to act against the resilient means so as to move the supports relative to each other in a second direction until the resilient means is balanced by the drive means, when the ICC read/write means is correctly positioned adjacent the card.

According to a second aspect of the invention there is provided a self service financial terminal comprising processing means; card receiving means; card read means; input means; display means; card sensor means; card transport means; and a card capture enclosure; characterized by card alignment means comprising a first moveable support carrying said card read means; a second moveable support carrying card stop means; resilient means to bias the first and second supports relative to each other in a first direction; first drive means arranged to act against the resilient means to move the supports relative to each other in a second direction until the resilient means is balanced by the drive means, when the card read means is correctly positioned adjacent said card; and second drive means arranged to retract the first and second moveable supports so that the card transport means can move said card into the card capture enclosure.

BRIEF DESCRIPTION OF THE DRAWINGS

The invention will now be described by way of example only with reference to the accompanying drawings in which.

DETAILED DESCRIPTION

Figure 1:
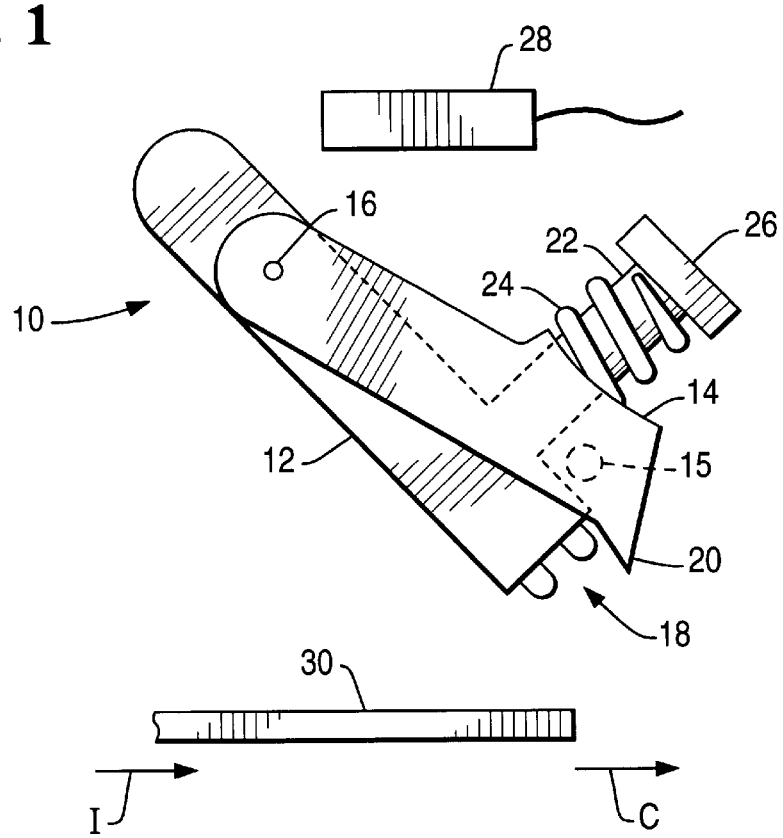
FIG. 1 shows a card alignment mechanism in a retracted position.

In FIG. 1, a card reader alignment mechanism 10 comprises a first arm 12 and a second arm 14, both pivoted about the same pivot 16 close to one end of each arm.

The end of the first arm 12 remote from the pivot 16 carries an ICC read head 18. The end of the second arm 14 remote from the pivot 16 has a lip 20 for engagement with a card to be read.

The first arm 12 carries on one side between the pivot and the ICC read head 18, and projecting perpendicular to the arm, a shank 22. The shank is surrounded by a coil spring 24 which acts between a head 26 of the shank and the side of the second arm, urging the second arm into clockwise rotation about the pivot 16 and towards the first arm. Adjacent the end of the first arm 12 is a solenoid 28.

The second arm 14 carries a stop 15 adjacent the lip 20; the stop contacts the edge of the first arm 12, and prevents further movement of the second arm 14 in a clockwise direction with respect to the first arm beyond the relative positions shown in the FIG.

The mechanism 10 in FIG. 1 is shown in a retracted position. A card 30 inserted manually into the card reader slot of an ATM is sensed by a sensor (not shown), and a motor (not shown) operates rollers (not shown) to draw the card further into the mechanism in the direction of the arrow I, to the position shown in FIG. 1 when the motor is stopped. The horizontal positioning of the card in the direction of the arrow I is not critical at this stage.

Figure 2:
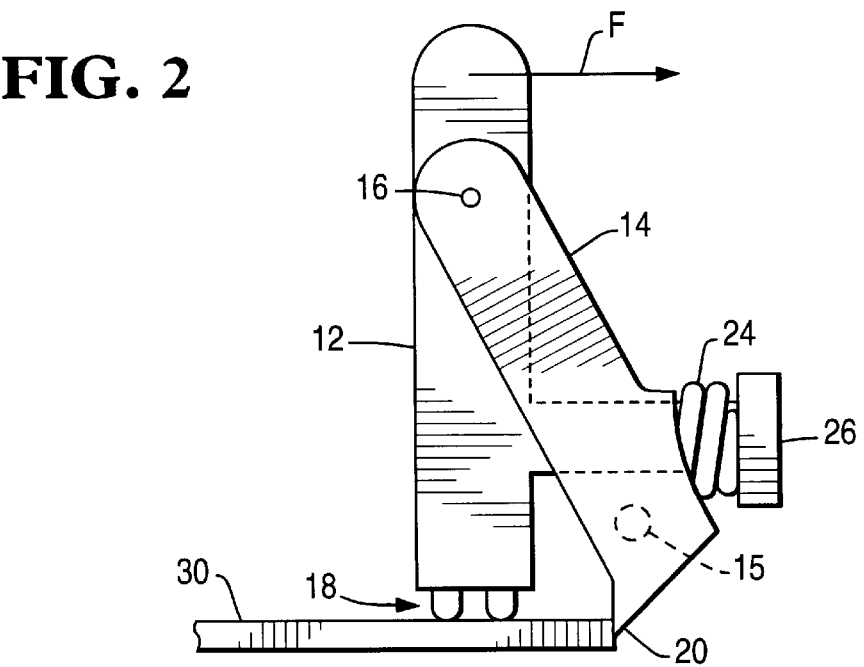
FIG. 2 shows the mechanism in a card alignment position.

FIG. 2 shows the card in correct alignment to be read. To reach this position, when the motor of the ATM is stopped, the solenoid 28 is operated to apply a force to the first arm 12 in the direction of the arrow F. The first and second arms 12, 14, rotate together in a clockwise direction about the pivot point 16 until the card engagement lip 20 on the second arm 14 contacts the card; this prevents further movement of the second arm 14, but the continued application of the force F causes the first arm 12 to rotate further, compressing the spring 24 between the shank head 26 and the second arm 14, which it overlaps. The strength of the spring 24 is selected so that when it is fully compressed by the force F of the solenoid, the ICC read head 18 is exactly aligned with the ICC recording means on the card 30.

The data on the ICC card 30 can then be read by the head 18.

The total movement of the arms is about 30 millimeters, which is not sufficient to push the card 30 out of the entry slot.

If the data on the card 30 indicates that the card has been stolen or used fraudulently, or if for some other reason the financial institution operating the ATM wishes to retain the card, the solenoid 28 is de-activated, and the first and second arms 12,14 then rotate anti-clockwise to their position shown in FIG. 1 The card 30 can then be moved by the motor-driven rollers along the direction indicated by the arrow C for capture in a secure enclosure.

The anti-clockwise movement is caused by the return spring (not shown) conventionally provided with a solenoid to reverse the action of the solenoid once power is switched off.

Figure 3:
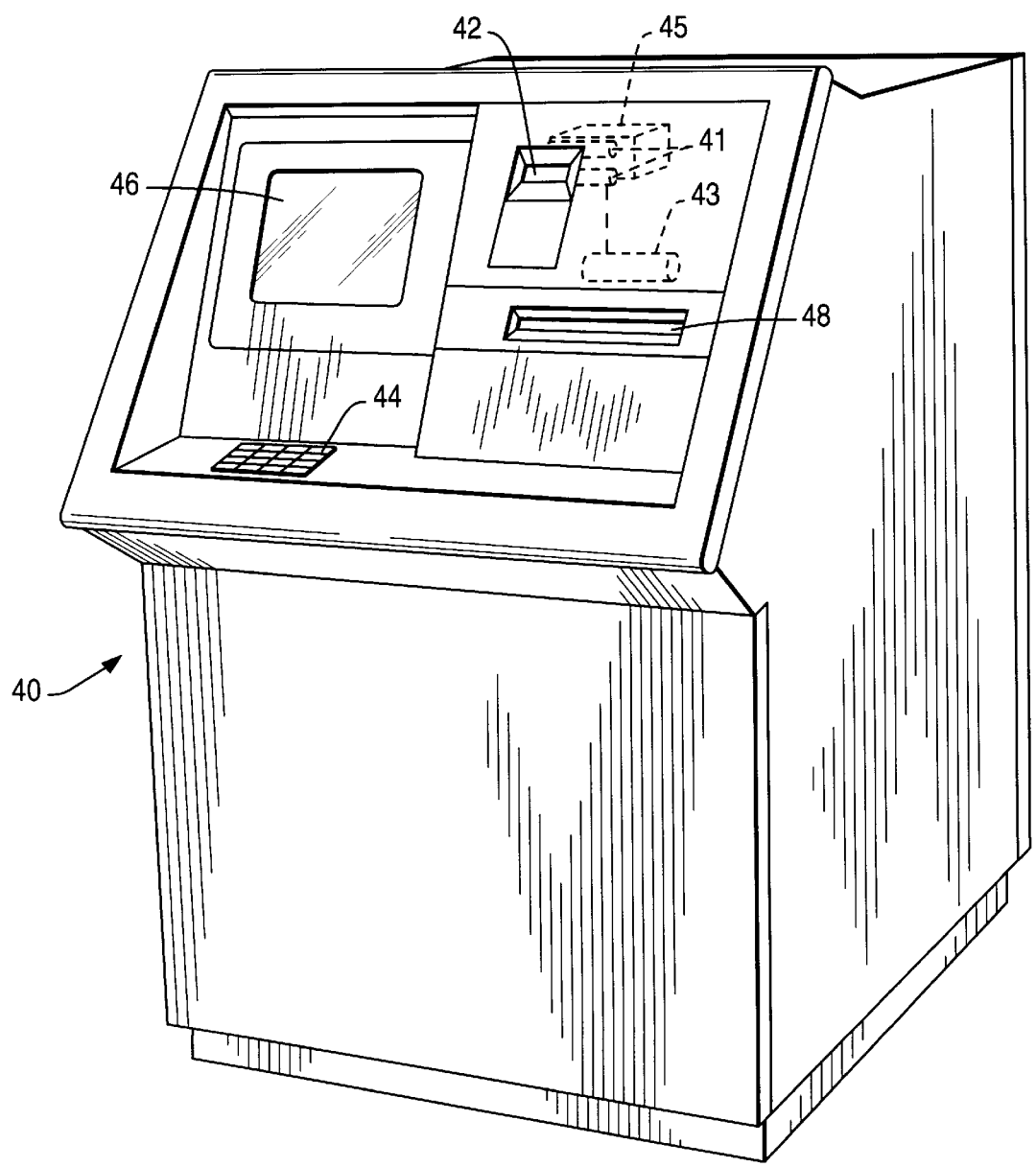
FIG. 3 shows an ATM having the card alignment mechanism of FIGS. 1+2.

FIG. 3 is a view of an ATM 40 incorporating a card reader according to the invention. The ATM 40 has a card input slot 42, a keypad 44, a display screen 46, and a currency note dispensing slot 48. Within the ATM are a pair of rollers 41 driven by a motor 43. The rollers 41 are positioned between the card input slot 42 and a card capture enclosure 45.

Figure 4:
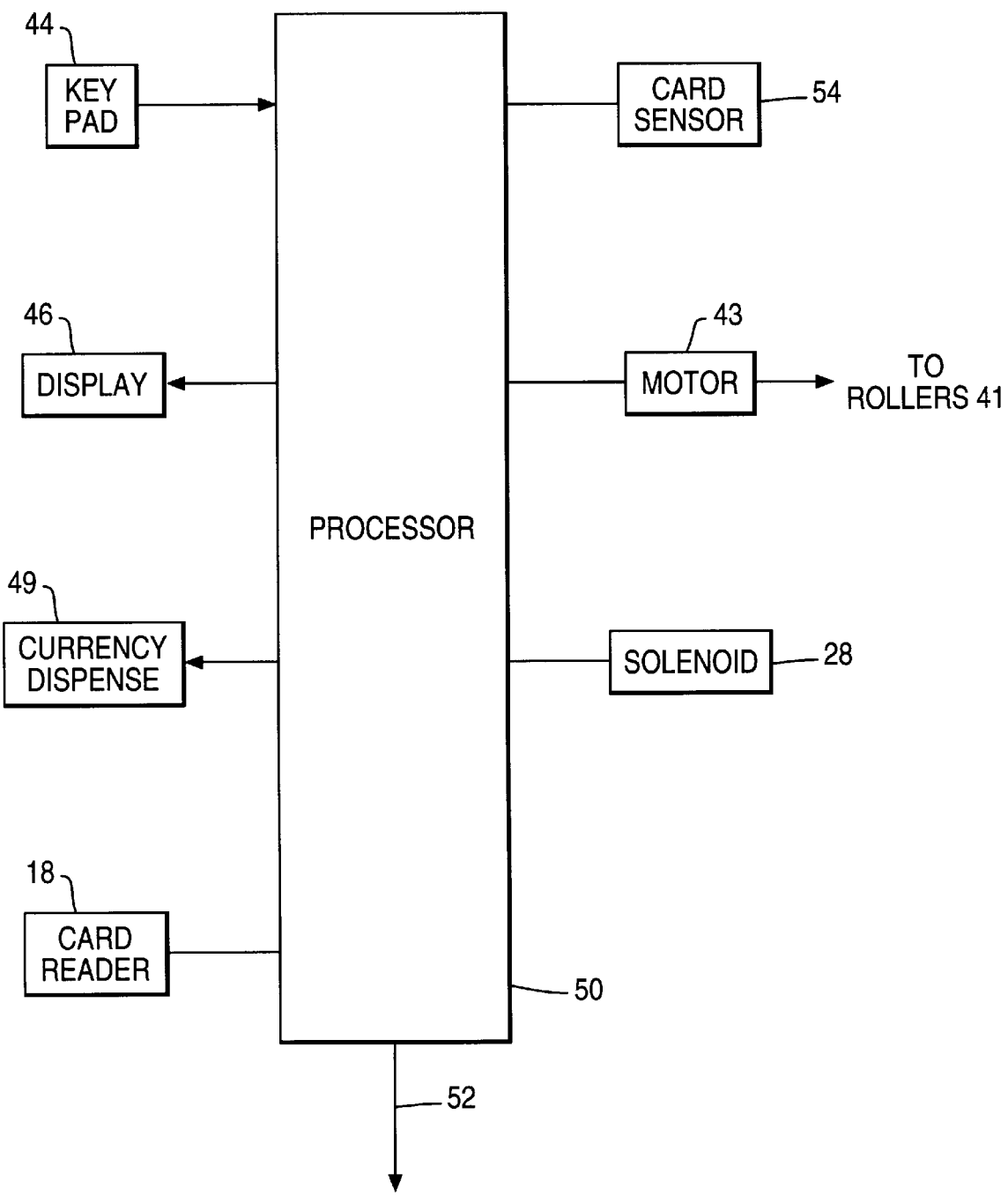
FIG. 4 shows the control system for such an ATM.

The control system for the ATM 40 is shown in FIG. 4, and is based on a processor 50 which receives instructions from the keypad 44, requests authorization over connection 52 from a central control point (not shown) operated by the financial authority providing the ATM. If authorized, the processor 50 instructs the currency dispense means 49 to dispense currency notes through the dispense slot 48.

The processor 50 is also connected to a card sensor 54 which is located adjacent the card input slot 42 shown in FIG. 3, and to the motor 43. The processor 50 is also connected to the solenoid 28 as shown in FIG. 1.

To initiate an ATM transaction, a user inserts a card carrying magnetically-recorded data into the slot 42. The card is sensed by the card sensor 54, the sensor passes an appropriate signal to the processor 50, which operates the motor 43 to drive the rollers 41 so as to draw the card into the ATM in the direction of the arrow I in FIG. 1 to the approximate position as shown in that Figure. The processor 50 instructs the motor 53 to stop, and then operates the solenoid 28 to cause rotation of the first and second arms 12,14 of the alignment mechanism to align the card 30 with the read/write contact head 18 as described above.

After the card has been read, the processor releases the solenoid 28, and the first and second arms return to the retracted position shown in FIG. 1.

If a card is authorized by the central authority, the transaction requested is completed and the processor 50 instructs the motor 43 to operate the rollers 41 in reverse to return the card through the slot 42.

If however the card is not authorized, and there is a wish to capture the card, the processor 50 instructs the motor 43 to operate in the forward direction, so that the rollers 41 drive the card 30 in the direction indicated in FIG. 1 by the arrow C, to the capture enclosure 45 (see FIG. 3). Since the arms 12,14 are retracted, they do not hinder the capture movement.

The processor 50 also displays a suitable message on the display screen 46, such as "CARD RETAINED".

While the invention has been described with reference to an ICC card reader/ writer, it can also be used for a magnetic card reader/ writer.

While the invention has been described with reference to a user card for an ATM, it can also be used in any other type of read or write terminal requiring accurate positioning of a data-bearing card, such as a SmartCard.

What is claimed is:

1. An integrated circuit contact (ICC) card reader/writer comprising:

means defining a card slot for receiving a card;

first and second movable support members;

ICC read/write means for (i) reading data from the card received in the card slot, and (ii) writing data to the card received in the card slot;

resilient means for biasing the first and second support members relative to each other in a first direction; and drive means other than the card for providing a force on one of the first and second movable support members which acts against the biasing force of the resilient means to move the first and second support members relative to each other in a second direction until the biasing force of the resilient means is balanced by the force of the drive means to position the read/write means adjacent the card received in the slot.

2. An ICC card reader/writer according to claim 1, wherein the first and second support members comprise first and second support arms, respectively, pivotable about a common pivot point.

3. An ICC card reader/writer according to claim 1, wherein the drive means includes a solenoid which is coupled to the one of the first and second support members to provide the force which acts against the biasing force of the resilient means.

4. An ICC card reader/writer according to claim 1, wherein the second support member includes an engagement lip which is engageable with the card received in the card slot to allow the first and second support members to move relative to each other as the force of the drive means acts against the biasing force of the resilient means.

5. An integrated circuit contact (ICC) card reader/writer comprising:

means defining a card slot for receiving a card;

first and second movable support members;

an ICC read/write device for (i) reading data from the card received in the card slot, and (ii) writing data to the card received in the card slot;

a spring for biasing the first and second support members relative to each other in a first direction; and a drive device other than the card for providing a force on one of the first and second movable support members which acts against the biasing force of the spring to move the first and second support members relative to each other in a second direction until the biasing force of the spring is balanced by the force of the drive device to position the read/write device adjacent the card received in the slot.

6. An ICC card reader/writer according to claim 5, wherein the first and second support members comprise first and second support arms, respectively, pivotable about a common pivot point.

7. An ICC card reader/writer according to claim 5, wherein the drive device includes a solenoid which is coupled to the one of the first and second support members to provide the force which acts against the biasing force of the spring.

8. An ICC card reader/writer according to claim 5, wherein the second support member includes an engagement lip which is engageable with the card received in the card slot to allow the first and second support members to move relative to each other as the force of the drive device acts against the biasing force of the spring.

9. An integrated circuit contact (ICC) card reader/writer comprising:

means defining a card slot for receiving a card;

first and second movable support members;

ICC read/write means for (i) reading data from the card received in the card slot, and (ii) writing data to the card received in the card slot;

resilient means for biasing the first and second support members relative to each other in a first direction; and drive means for providing a force which acts against the biasing force of the resilient means to move the first and second support members relative to each other in a second direction until the biasing force of the resilient means is balanced by the force of the drive means to position the read/write means adjacent the card received in the slot;

the biasing force of a resilient means biasing the first and second support arms towards each other about the common pivot point and against a support stop;

the drive means operating to rotate the first and second support arms away from each other about the common pivot point.

10. An ICC card reader/writer according to claim 9, wherein the resilient means includes a spring acting between a head of a shank on the first support arm and the second support arm.

11. An integrated circuit contact (ICC) card reader/writer comprising:

means defining a card slot for receiving a card;

first and second movable support members;

an ICC read/write device for (i) reading data from the card received in the card slot, and (ii) writing data to the card received in the card slot;

a spring for biasing the first and second support members relative to each other in a first direction; and a drive device for providing a force which acts against the biasing force of the spring to move the first and second support members relative to each other in a second direction until the biasing force of the spring is balanced by the force of the drive device to position the read/write device adjacent the card received in the slot;

the biasing force of the spring biasing the first and second support arms towards each other about a common pivot point and against a support stop;

the drive device operating to rotate the first and second support arms away from each other about the common pivot point.

12. An ICC card reader/writer according to claim 11, wherein the spring acts between a head of a shank on the first support arm and the second support arm.

* * * * *

UNITED STATES PATENT AND TRADEMARK OFFICE
CERTIFICATE OF CORRECTION

PATENT NO. : 5,984,179
DATED : November 16, 1999
INVENTOR(S) : David C. C. May

It is certified that error appears in the above-indentified patent and that said Letters Patent is hereby corrected as shown below:

Column 5, Line 4, delete "the" and insert -- a --.

Signed and Sealed this

Twenty-seventh Day of March, 2001

Attest:

NICHOLAS P. GODICI

*Attesting Officer*    *Acting Director of the United States Patent and Trademark Office*